(12) United States Patent
Perez-Feliciano

(10) Patent No.: US 9,703,268 B2
(45) Date of Patent: Jul. 11, 2017

(54) GAUGE OPACITY CONTROL

(71) Applicant: Lenovo (Singapore) Pte. Ltd., Singapore (SG)

(72) Inventor: David Perez-Feliciano, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/851,556

(22) Filed: Sep. 11, 2015

(65) Prior Publication Data
US 2017/0075314 A1    Mar. 16, 2017

(51) Int. Cl.
| | | |
|---|---|---|
| *G04B 47/00* | (2006.01) | |
| *G04G 9/00* | (2006.01) | |
| *G04G 9/06* | (2006.01) | |
| *G02F 1/133* | (2006.01) | |
| *G04B 19/06* | (2006.01) | |
| *G02F 1/163* | (2006.01) | |

(52) U.S. Cl.
CPC ....... *G04G 9/0064* (2013.01); *G02F 1/13306* (2013.01); *G02F 1/163* (2013.01); *G04B 19/06* (2013.01); *G04B 47/00* (2013.01)

(58) Field of Classification Search
CPC ...... G04G 9/00; G04G 9/0023; G04G 9/0029; G04G 9/0035; G04G 9/0064; G04G 9/0094; G04G 9/06; G04G 9/12; G04G 17/045; G02F 1/0045; G02F 1/1335; G02F 1/163; G02F 1/13306
See application file for complete search history.

(56) References Cited

U.S. PATENT DOCUMENTS

| | | | | |
|---|---|---|---|---|
| 3,577,876 | A * | 5/1971 | Spadini | G04G 13/021 368/250 |
| 3,952,497 | A * | 4/1976 | Schulz | G04C 11/084 368/158 |
| 5,487,053 | A * | 1/1996 | Beiswenger | G04G 5/00 345/173 |
| 5,892,455 | A * | 4/1999 | Matsumoto | G09F 23/16 340/7.55 |
| 6,587,083 | B1 * | 7/2003 | Basturk | G02F 1/133536 345/4 |
| 6,600,527 | B1 * | 7/2003 | Basturk | G02F 1/133536 349/115 |
| 6,903,784 | B1 | 6/2005 | Basturk | |
| 8,593,912 | B1 * | 11/2013 | Amores | G04G 11/00 368/239 |
| 2002/0071347 | A1 | 6/2002 | Gilomen | |

(Continued)

FOREIGN PATENT DOCUMENTS

| | | |
|---|---|---|
| EP | 1455250 A2 | 9/2004 |
| EP | 2913723 A1 | 9/2015 |
| GB | 2291723 A | 1/1996 |

OTHER PUBLICATIONS

Examination Report, Application No. GB1615414.8, dated Mar. 8, 2017 (9 pages).

*Primary Examiner* — Vit W Miska
(74) *Attorney, Agent, or Firm* — Brian J. Pangrle

(57) ABSTRACT

An apparatus can include a case that includes a dial and an indicator; a mechanism operatively coupled to the indicator and disposed at least in part in the case; an electronic lens that covers at least a portion of the dial; and circuitry that controls opacity of the electronic lens.

20 Claims, 10 Drawing Sheets

(56) References Cited

U.S. PATENT DOCUMENTS

| | | | |
|---|---|---|---|
| 2002/0118605 A1* | 8/2002 | Born | G04G 21/08 368/69 |
| 2011/0141856 A1* | 6/2011 | Cho | G04G 11/00 368/11 |
| 2015/0078144 A1* | 3/2015 | Gong | G04C 17/0041 368/228 |
| 2015/0346694 A1* | 12/2015 | Hoobler | G04G 9/00 368/223 |

* cited by examiner

Display System 800

TFT Electrical Structure

TFT Cell Structure

GAUGE OPACITY CONTROL

TECHNICAL FIELD

Subject matter disclosed herein generally relates to opacity control.

BACKGROUND

So-called smart glass can respond to a stimulus that causes it to change its opacity. For example, a passive smart glass may respond to an increasing intensity of sunlight by increasing its opacity.

SUMMARY

An apparatus can include a case that includes a dial and an indicator; a mechanism operatively coupled to the indicator and disposed at least in part in the case; an electronic lens that covers at least a portion of the dial; and circuitry that controls opacity of the electronic lens. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
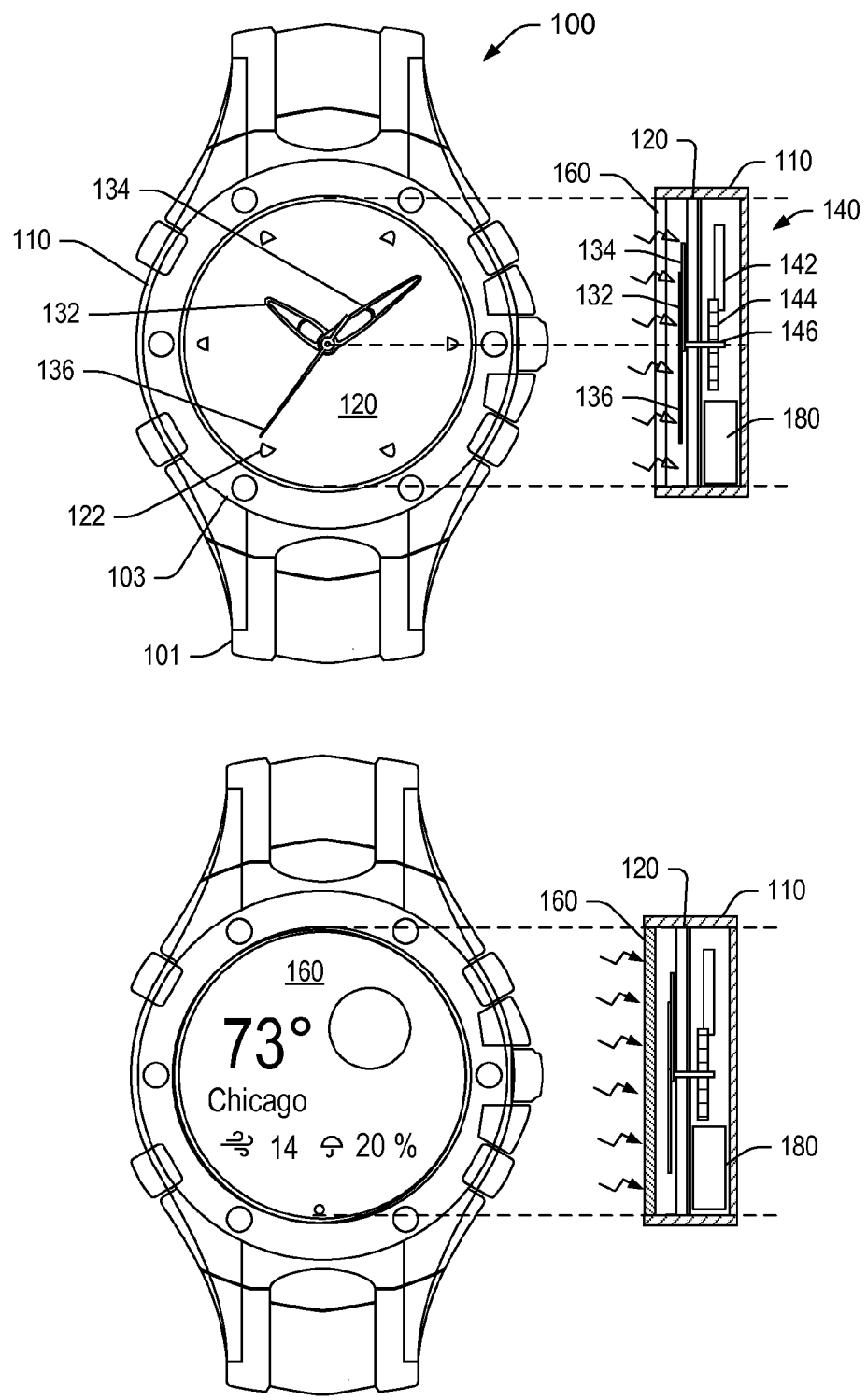
FIG. 1 is a series of diagrams of an example of a device.

FIG. 1 shows an example of a device 100 that includes a case 110 that includes a dial 120 and at least one indicator 132, 134 and 136; a mechanism 140 operatively coupled to at least one of the at least one indicator 132, 134 and 136 and disposed at least in part in the case 110; an electronic lens 160 that covers at least a portion of the dial 120; and circuitry 180 that controls opacity of the electronic lens 160.

As shown in the example of FIG. 1, the device 100 can include a band 101, which may be, for example, a wrist band that is operatively coupled to the case 110. As an example, a band may be adjustable and allow for wearing of the device 100 on a wrist of an individual. As an example, a band may be detachable, replaceable, etc. As an example, a band may include a clasp or other mechanism to help secure a device to a wearer.

As shown in the example of FIG. 1, the dial 120 is a face upon which some measurement is registered. For example, the dial 120 can include one or more markers 122 (e.g., graduations, etc.) that correspond to one or more of an hour, a minute, etc. In such an example, the indicators 132, 134 and 136 (e.g., hands, pointers, needles, etc.) may move in a measured fashion to register time on the dial 120.

As an example, a device may be or include a gauge such as, for example, a temperature gauge where a dial includes temperature markings (e.g., in Fahrenheit, Celsius, etc.) and where an indicator in combination with the markings can register temperature. As an example, a gauge may be for a measure such as velocity, revolutions per unit time, temperature, pressure, volume (e.g., of liquid, gas, etc.), charge, voltage, amperage, etc. A gauge may be an instrument that provide for measurement readings. As an example, a gauge may be operatively coupled to a power supply and/or may be operatively coupled to a signal source, for example, to provide a measurement signal that can at least in part control one or more indicators. As an example, a gauge may include a signal interface where a signal received via the interface may control circuitry that controls opacity of an electronic lens.

As an example, a watch may be or include a gauge that registers time. In horology, a complication refers to a feature in a mechanical timepiece beyond the display of hours and minutes. A mechanical timepiece that indicates solely hours and minutes may be referred to as a simple movement timepiece. As an example, a watch may include one or more complications such as, for example, a date mechanism, a day mechanism, a day/date mechanism, a stop watch mechanism, an additional time zone mechanism, an alarm mechanism, etc. As an example, a complication may be operatively coupled to a trigger that can cause a change in opacity of an electronic lens of a device. For example, at the top of an hour, a device may temporarily transition an electronic lens from one opacity state to another opacity state. As an example, a mechanical alarm mechanism may include an adjustable alarm indicator that can at a set time trigger an opacity state transition. For example, consider a mechanical switch that electrically activates a circuit that causes a change in opacity of an electronic lens.

As an example, the device 100 can include a bezel 103, which may be a fixed position bezel, a uni-directional rotational bezel or a bi-directional rotational bezel. As an example, the bezel 103 may be operatively coupled to circuitry of the device 100, for example, to control operation of such circuitry, for example, optionally to control opacity of the electronic lens 160. For example, the bezel 103 may be rotatable to various positions where the positions correspond to different opacity states. As an example, a rotatable bezel may be part of an opacity adjustment mechanism where rotation in one direction increases opacity and rotation in an opposite direction decreases opacity.

As an example, a gauge can include a case that includes a dial and at least one indicator; a mechanism operatively coupled to at least one of the at least one indicator and disposed at least in part in the case; an electronic lens that covers at least a portion of the dial; and circuitry that controls opacity of the electronic lens.

As shown in the example of FIG. 1, where the electronic lens 160 becomes substantially opaque, the dial 120 may not be visible and the indicators 132, 134 and 136 may not be visible either. In the example of FIG. 1, the electronic lens 160 can have information rendered to it such as, for example, weather information. For example, the circuitry 180 may be operatively coupled to the electronic lens 160 to control its opacity and to control rendering of information to the electronic lens 160. In such an example, rendering may be via the electronic lens 160 and/or via projection where the electronic lens 160 operates at least in part as a projection screen.

In the example of FIG. 1, the mechanism 140 may be or include a watch mechanism or movement (e.g., or timepiece) and include, for example, a spring 142 operatively coupled to a gear 144 that is operatively coupled to a shaft 146 (e.g., an arbor, etc.) that is operatively coupled to at least one of the indicators 132, 134 and 136. As an example, a mechanism can include a plurality of gears and a shaft or shafts that operatively couple to one or more indicators. As an example, a shaft (e.g., an arbor or a stem) may be a shaped cylindrical axle on which other parts are fixed or turn. For example, a shaft may support a barrel and spindles of train-wheels.

As an example, a mechanism can include a power source, a wheel train, an escapement and an oscillator. For example, a power source can be a mechanical power source such as a mainspring or a weight suspended from a cord wrapped around a pulley. A power source can include a winding mechanism that allows winding-up of a power source (e.g., a mainspring) to store power, for example, consider a ratchet that can catch and prevent unwinding of a mainspring.

As to a wheel train or gear train, it can transmit at least a portion of force of the power source to an escapement. In a wheel train, one or more gears may be referred to as wheels that act to mesh with smaller gears, which may be referred to as pinions. As an example, wheels can include a center wheel, a third wheel, and a fourth wheel. As an example, another set of wheels can provide for "motion work" (e.g., motion work wheels), for example, to divide the motion of a minute hand by 12 to move an hour hand. As an example, yet another set of wheels may provide for "keyless work" (e.g., keyless work wheels), for example, allowing hands to be set.

An escapement can allow a wheel train (e.g., or gear train) to advance, or escape, a fixed amount with each swing of a balance wheel or a pendulum that function as an oscillator. An escapement can include a gear referred to as an escape wheel, for example, an escapement can include a toothed wheel that is released one tooth at a time by a lever that rocks back and forth. In such an example, for each instance that the escape wheel moves forward, the escape wheel can give a balance wheel (e.g., or a pendulum) a push to keep it moving.

As to an oscillator, it is a timekeeping element and may be rated as to frequency of operation. An oscillator may be, for example, a pendulum, a balance wheel or other type of element. An oscillator may swing back and forth with a precisely constant time interval between each swing, which may be referred to as the beat. An oscillator can include a tuner for adjusting an oscillation rate. As an example, a balance wheel can be operatively coupled to a regulator lever on a balance spring where the regulator lever operates as a tuner. As an example, a balance wheel may oscillate over 10,000 times per hour (e.g., consider a balance wheel that oscillates 28,800 times per hour).

As an example, a device can include a quartz movement that may be powered at least in part via an electronic storage unit such as a battery. A quartz movement may be powered electrically to cause a quartz crystal to oscillate. For example, consider an oscillation rate of about 32,786 times per second (32,768 Hz).

As an example, a device with a quartz movement may provide for analog time display, for example, a dial with at least one rotating hand (e.g., indicator). As an example, a quartz movement may be coupled to a digital display (e.g., a liquid crystal display, etc.). As an example, a device with a quartz movement may provide analog and digital time readouts for simultaneous display of different information on a common face (e.g., a common dial). Such a device may be referred to as including an "ana-digi" dial.

As an example, a device can include a case that includes a dial and an indicator; a mechanism operatively coupled to the indicator and disposed at least in part in the case; an electronic lens that covers at least a portion of the dial; and circuitry that controls opacity of the electronic lens. In such an example, a dial can be a face upon which measurement of time (e.g., or other measurement) is registered.

Figure 2:
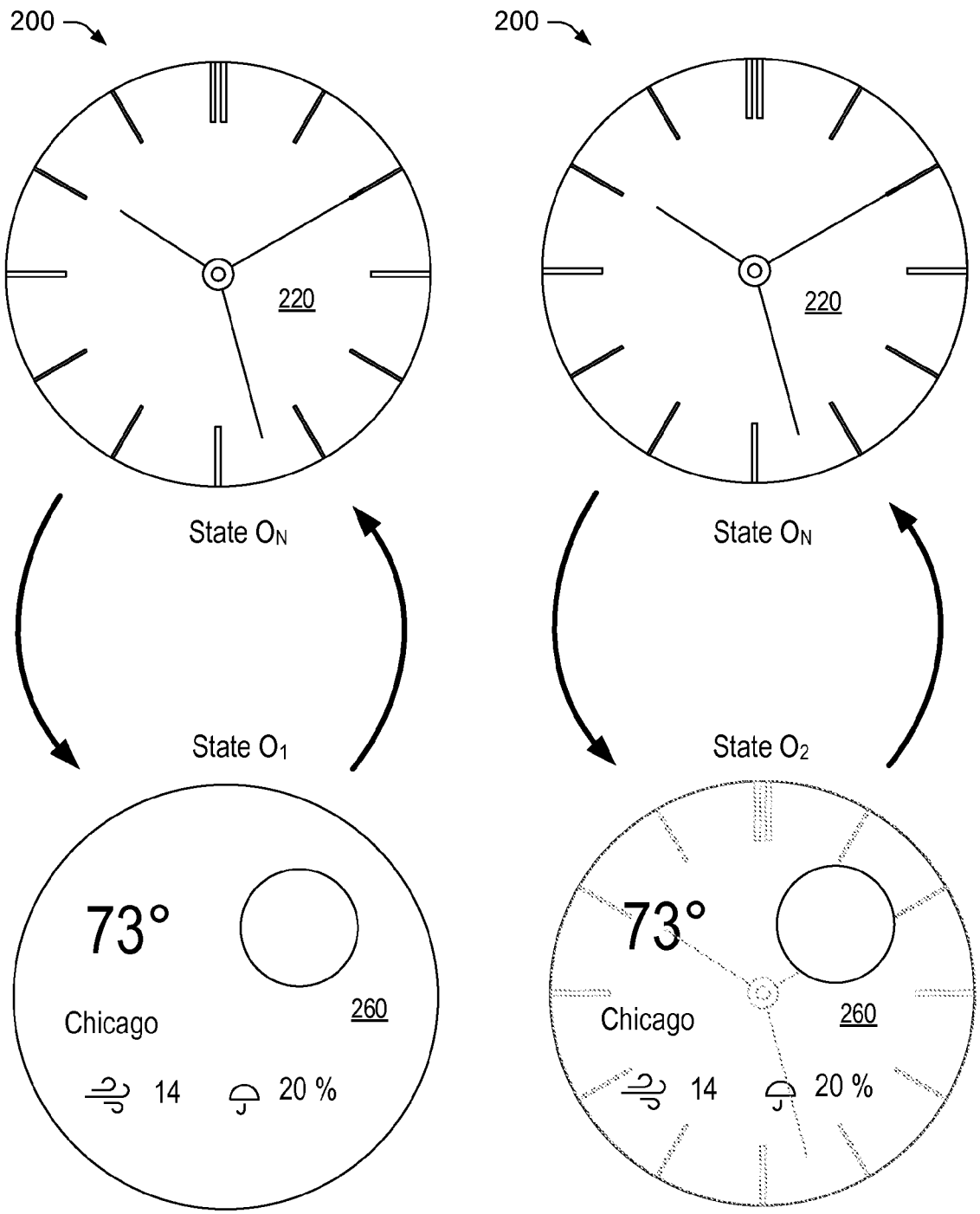
FIG. 2 is a series of diagrams of an example of a device in various states.

FIG. 2 shows examples of opacity states of a device 200 that includes a dial 220 and an electronic lens 260. In the examples of FIG. 2, the opacity states include a State $O_N$, a State $O_1$ and a State $O_2$.

In the field of optics, transparency, which may be referred to as pellucidity or diaphaneity, is a physical property of allowing light to pass through material without being scattered. On a macroscopic scale (e.g., where dimensions investigated are much, much larger than the wavelength of photons in question), photons may follow Snell's Law. Translucency, which may be referred to as translucence or translucidity, is a super-set of transparency: it allows light to pass through, but does not necessarily (e.g., on a macroscopic scale) follow Snell's law; photons can be scattered at interfaces where there is a change in index of refraction, or internally. A translucent medium can allow for the transport of light while a transparent medium allows for the transport of light and allows for image formation.

An opposite property of translucency is opacity and materials that do not transmit light can be referred to as being opaque. Opacity is a measure of impenetrability to electromagnetic, particularly visible light (e.g., light in a spectrum from about 400 nm to about 700 nm). An opaque object is neither transparent (allowing all light to pass through) nor translucent (allowing some light to pass through). When light strikes an interface between two substances, in general some may be reflected, some absorbed, some scattered, and some transmitted. Reflection can be diffuse, for example light reflecting off a white wall, or specular, for example, consider light reflecting off a mirror. An opaque substance transmits no light, and therefore reflects, scatters, or absorbs it. Opacity can depend on the frequency of the light being considered. For instance, some kinds of glass, while transparent in the visual range, are largely opaque to ultraviolet light.

Opacity may be quantified in one or more ways. As an example, in astronomy, plasma physics, and some other fields, "opacity" corresponds to a mass attenuation coefficient (e.g., or mass absorption coefficient) $\kappa_\nu$ at a particular frequency $\nu$ of electromagnetic radiation. As an example, if a beam of light with frequency $\nu$ travels through a medium with opacity $\kappa_\nu$ and mass density $\rho$, both being substantially constant, then the intensity I will be reduced with distance x according to the formula:

$$I(x) = I_0 e^{-\kappa_\nu \rho x}$$

where x is the distance the light has traveled through the medium, I(x) is the intensity of light remaining at distance x, $I_0$ is the initial intensity of light, at x=0.

For a given medium at a given frequency, opacity $\kappa_v$ can have a numerical value that may range between 0 and infinity, with units of length$^2$/mass. Thus, where opacity, $\kappa_v$, is approximately 0, light is not attenuated; and, where it tends to infinity, light is heavily attenuated and a medium (e.g., a material) may be characterized as being opaque.

Referring again to FIG. 2, the opacity State $O_N$, can be referred to as being a translucent opacity state (e.g., substantially transparent), the opacity State $O_1$ can be referred to as being an opaque opacity state and the opacity State $O_2$ can be referred to as being a substantially opaque opacity state as the dial 220 (e.g., and/or one or more indicators) may be somewhat visible through the electronic lens 260; however, not readily visible as in the opacity State $O_N$.

As an example, opacity states can be states of an electronic lens that covers at least a portion of a dial where circuitry can control opacity of the electronic lens, for example, by transitioning the electronic lens from one state to another state. An electrically powered field may cause an electronic lens to transition from one state to another state, for example, by altering opacity, $\kappa_v$, of the electronic lens. As an example, an electronic lens may include anti-reflection material such as one or more anti-reflection coatings.

As an example, an electronic lens can include a substantially transparent state and at least one substantially opaque state.

Figure 3:
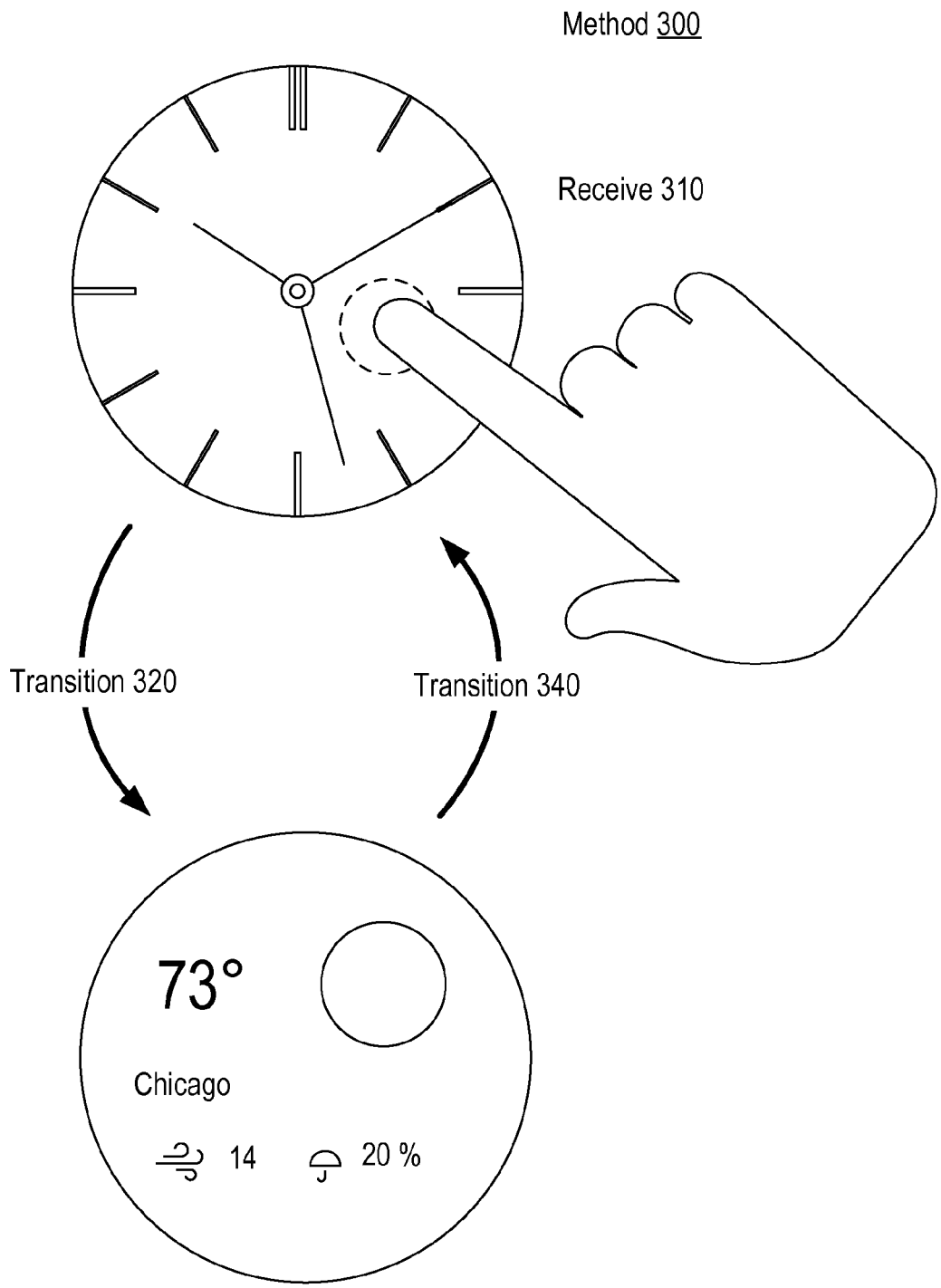
FIG. 3 is a diagram of an example of a method.

FIG. 3 shows an example of a method 300 that includes receiving a touch signal 310 and transitioning an electronic lens from one state to another state 320. In such an example, a user may touch the electronic lens with a finger where a sensor or sensors can detect the touch (e.g., or proximity of the finger to the electronic lens). In response, circuitry may control the opacity of the electronic lens to transition it from one state to another state. As an example, the method 300 can include transitioning 340 after a period of time or in response to receipt of another signal, information, etc.

Figure 4:
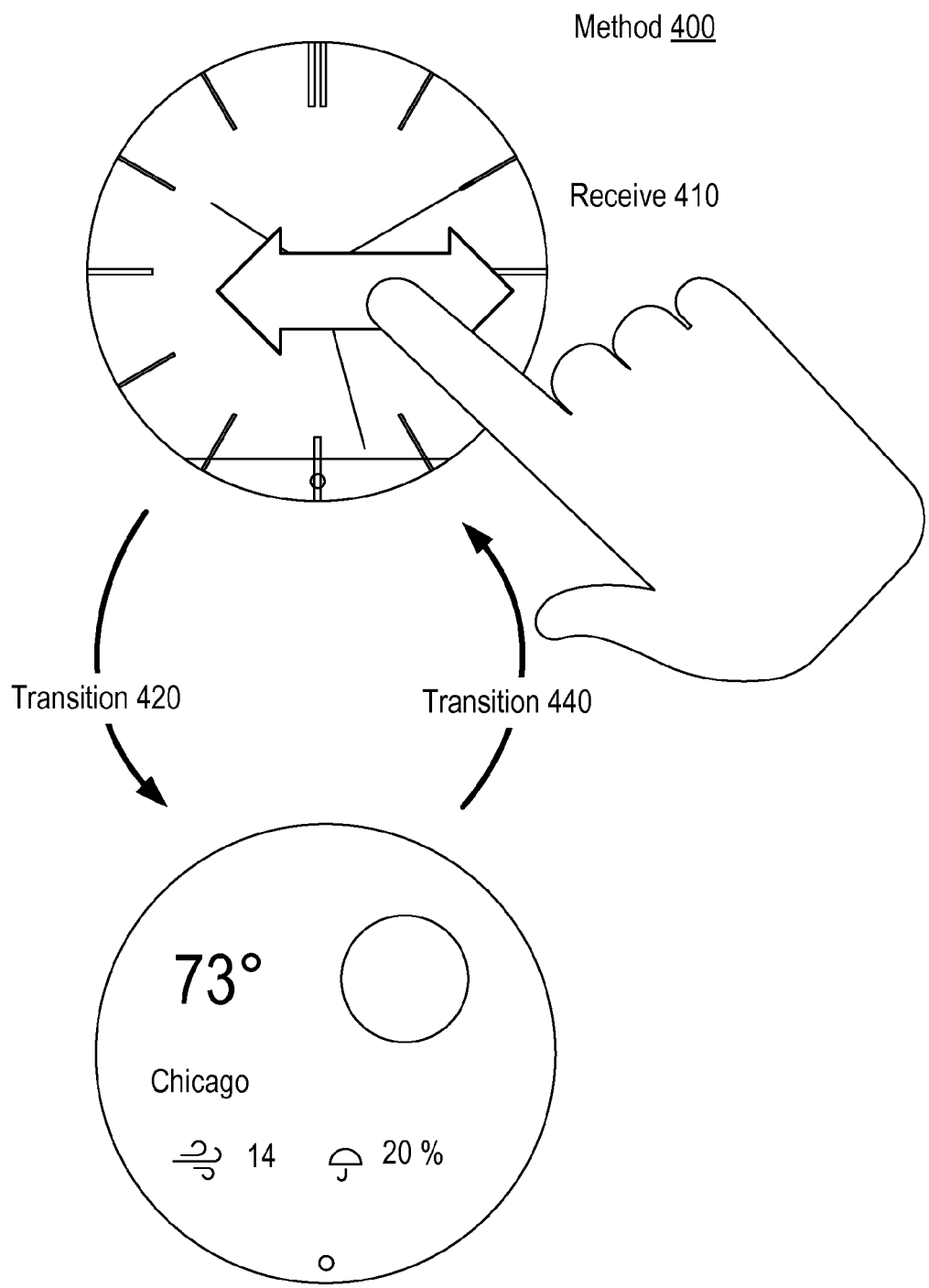
FIG. 4 is a diagram of an example of a method.

FIG. 4 shows an example of a method 400 that includes receiving a touch signal 410 (e.g., a swipe signal or other type of gesture signal) and transitioning an electronic lens from one state to another state 420. In such an example, a user may touch the electronic lens with a finger and move the finger where a sensor or sensors can detect the touch and the movement (e.g., or proximity of the finger and movement thereof with respect to the electronic lens). In response, circuitry may control the opacity of the electronic lens to transition it from one state to another state. As an example, the method 400 can include transitioning 440 after a period of time or in response to receipt of another signal, information, etc. In the example of FIG. 4, a swipe in one direction may effectuate a first transition and a swipe in an opposite direction may effectuate a second, different transition (e.g., a reverse transition of the first transition).

As an example, a method can include controlling an indicator of a dial; for a period of time, rendering information to an electronic display that covers at least a portion of the dial; and after the period of time, adjusting opacity of the electronic display to a substantially transparent state. For example, consider the device 100 and the indicator 134 of the dial 120. In such an example, the circuitry 180 may render information to the electronic lens 160, which may be or include an electronic display. For example, the electronic lens 160 may serve as a back projection electronic display and/or include one or more embedded components (e.g., embedded LEDs, etc.). In such an example, after a period of time, the electronic display (e.g., the electronic lens 160) may be adjusted as to its opacity to a substantially transparent state, which can allow for light to pass for illuminating at least the indicator 134 of the dial 120.

As an example, an indicator may include a material that can emit photons. For example, an indicator may be coated with a material that can emit photons and/or include a capsule (e.g., a tube) of a material that can emit photons. As an example, a material may absorb energy from a certain wavelength or wavelengths (e.g., consider about 200 nm to about 450 nm) and release such energy over a period of time and at a different wavelength or wavelengths. As an example, an indicator may include a material that can phosphoresce (e.g., photoluminesce).

As an example, one or more computer-readable storage media can include processor-executable instructions executable to instruct a computing device to: render information to an electronic display that covers at least a portion of a dial; and adjust opacity of the electronic display to a substantially transparent state.

Figure 5:
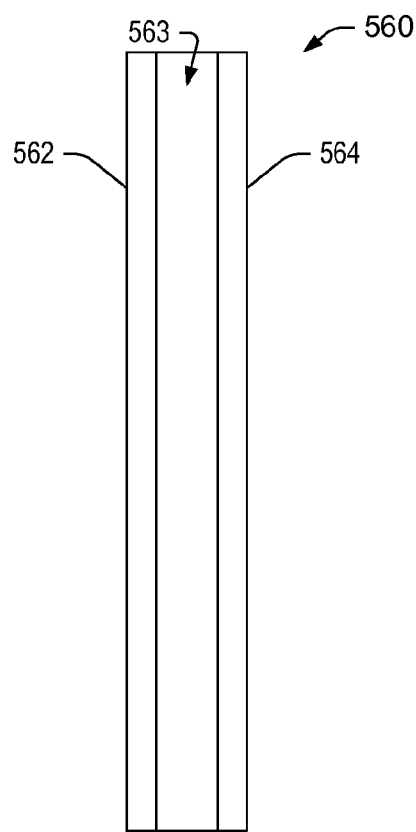
FIG. 5 is a diagram of examples of smart glass.
Figure 5:
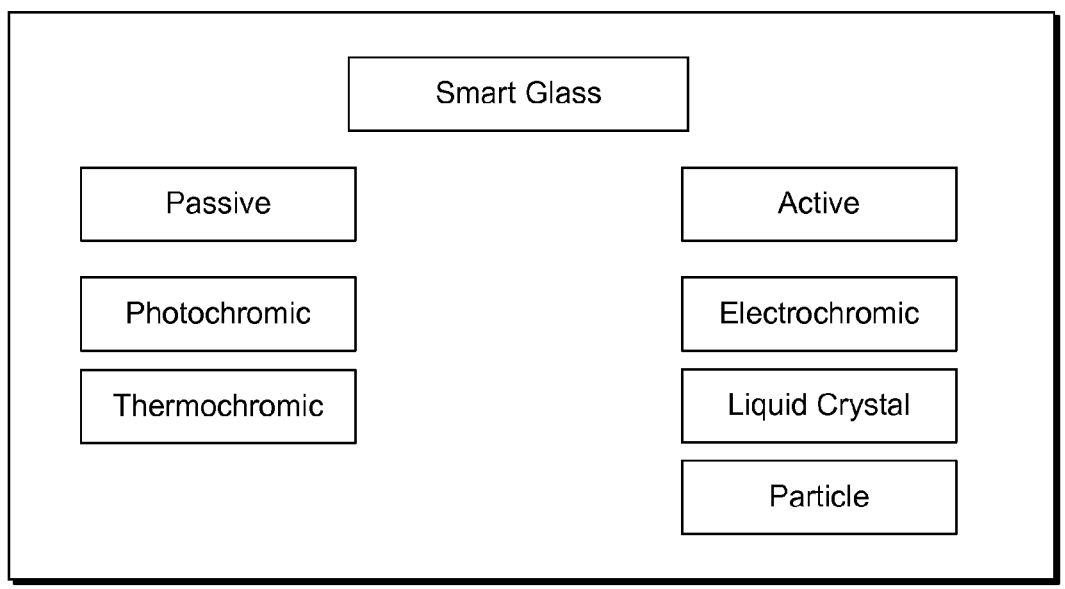

FIG. 5 shows an example of an electronic lens 560 that includes a first outer layer 562, an intermediate layer 563 and a second outer layer 564. As an example, the electronic lens 560 may be or include smart glass.

Smart glass (e.g., switchable glass) can change its light transmission properties based on one or more types of external stimuli. Active smart glass may respond to an electrical field and passive smart glass may respond to one or more environmental factors (e.g., heat, UV radiation, etc.). As an example, smart glass may be passive and/or active.

Electrochromic, suspended particle, and liquid crystal are some examples of active smart glass technologies that can respond to an electrically powered field as a stimulus and adjust one or more light transmission properties dynamically. Passive smart glass technologies such as, for example, thermochromic and photochromic, can react to heat or light, respectively.

Electrochromic glass can change light transmission properties in response to voltage. Electrochromic glass can include stacked porous layers printed on top of each other on a substrate modified with a transparent conductor (such as ITO or PEDOT:PSS). In such an example, a printed layer can have a function or functions. As an example, a working electrode can include a positive porous semiconductor (e.g., titanium dioxide, $TiO_2$) with adsorbed chromogens (e.g., one or more different chromogens for different colors). Such chromogens can change color by reduction or oxidation. A passivator can be used as the negative of an image to improve electrical performance. An insulator layer can serve the purpose of increasing contrast ratio and separating a working electrode electrically from a counter electrode. A counter electrode can provide a high capacitance to counterbalances charge inserted/extracted on an SEG electrode (e.g., and help to maintain overall charge neutrality). As an example, a conducting carbon layer may be used as a conductive back contact for a counter electrode. As an example, a porous monolithic structure may be overprinted with a liquid or polymer-gel electrolyte, dried, and then may be incorporated into various encapsulation or enclosures, depending on the application requirements.

Electrochromic glass can be relatively thin (e.g., about 30 microns). Such glass may be switched on by applying an electrical potential to the transparent conducting substrate relative to the conductive carbon layer. Such a process can cause a reduction of viologen molecules (coloration) to occur inside a working electrode. By reversing the applied potential or providing a discharge path, the glass can "bleach". For an electrochromic monolith, a relatively low voltage (e.g., about 1 V) can be used to color or bleach viologens (e.g., consider a small over-potentials to drive the electrochemical reduction of the surface adsorbed viologens/chromogens).

As an example, an electrochromic electronic lens may include transition metal hydride electrochromics. In such an example, an electronic lens may generate a reflective surface. As an example, such a switchable mirror may include a translucent state (e.g., a substantially transparent state) when not subjected to a field (e.g., not exposed to a voltage field, which may be an "off" state) and transition to a reflective state when subjected to a field (e.g., exposed to a voltage field, which may be an "on" state).

In polymer dispersed liquid crystal glass, liquid crystals can be dissolved or dispersed into a liquid polymer followed by solidification or curing of the polymer. During the change of the polymer from a liquid to solid, the liquid crystals can become incompatible with the solid polymer and form droplets throughout the solid polymer. The curing conditions can affect the size of the droplets that in turn affect the final operating properties of the smart glass. As an example, a liquid mix of polymer and liquid crystals can be placed between two layers of glass or plastic that can include a thin layer of a transparent, conductive material followed by curing of the polymer, thereby forming the basic sandwich structure of the smart glass. In effect, such a structure can be a capacitor.

For liquid crystal smart glass, electrodes from a power supply can be attached to transparent electrodes. With no applied voltage, the liquid crystals can be randomly arranged in droplets, resulting in scattering of light as it passes through the smart glass. This can result in a translucent, "milky white" appearance. When a voltage is applied to the electrodes, the electric field formed between the two transparent electrodes on the glass causes the liquid crystals to align, allowing light to pass through the droplets with very little scattering and resulting in a substantially transparent state. As an example, degree of transparency can be controlled by the applied voltage. Such an approach operates because, at lower voltages, few of the liquid crystals align completely in the electric field and hence a small portion of the light passes through while most of the light is scattered. As voltage is increased, fewer liquid crystals remain out of alignment, resulting in less light being scattered.

In suspended particle glass, a thin film laminate of rod-like nano-scale particles can be suspended in a liquid and placed between two pieces of glass or plastic, or attached to one layer. When no voltage is applied, the suspended particles are randomly organized, thus acting to block and absorb light. Whereas, when voltage is applied, the suspended particles can align and let light pass. As an example, varying the voltage of the film can vary the orientation of the suspended particles, thereby regulating the tint and the amount of light transmitted.

As an example, suspended particle glass may be manually and/or automatically "tuned" to control the amount of light passing through. As an example, smart glass can be controlled through one or more of a variety of techniques, such as, for example, sensors or switches.

As an example, a device may include an electronic lens that includes one or more LED (light-emitting diodes). As an example, an electronic lens may be or include an LED-embedded light film. As an example, a LED embedded film can be a polyester-based translucent and electro-conductive film that can transmit electricity to LEDs and/or other electronic elements on the film.

As an example, a device can include an electronic lens that includes transparent conducting film. Transparent conducting films (TGFs) can be optically translucent and electrically conductive. As an example, indium tin oxide (ITO) may be included in a TCF and/or one or more other conductors (e.g., another oxide, a conductive polymer, etc.). As an example, a doped metal oxide may use as a transparent conducting layer in an electronic lens.

As an example, a device can include a backlit LCD, an OLED display and/or another type of display. In a backlit LCD and an OLED display, electrical power can generate light. As an example, for a smart watch, one or more mechanisms may allow for switching on a light generator (e.g., a manual button, a touchscreen gesture, monitoring motion and/or position, etc.).

As an example, a device can include a reflective display, which may use existing ambient light. As an example, a display can include an optically resonant cavity (e.g., akin to a Fabry-Perot etalon). In such an example, the display can include a self-supporting deformable reflective membrane and a thin-film stack (e.g., each of which acts as one mirror of an optically resonant cavity), both residing on a transparent substrate. In such an example, when ambient light hits the structure, it is reflected both off the top of the thin-film stack and off the reflective membrane. Depending on the height of the optical cavity, light of certain wavelengths reflecting off the membrane will be slightly out of phase with the light reflecting off the thin-film structure. Based on the phase difference, some wavelengths will constructively interfere, while others will destructively interfere. As an example, a display may operate via a backlit transmission mode and a reflective mode (e.g., consider a transflective LCD).

Figure 6:
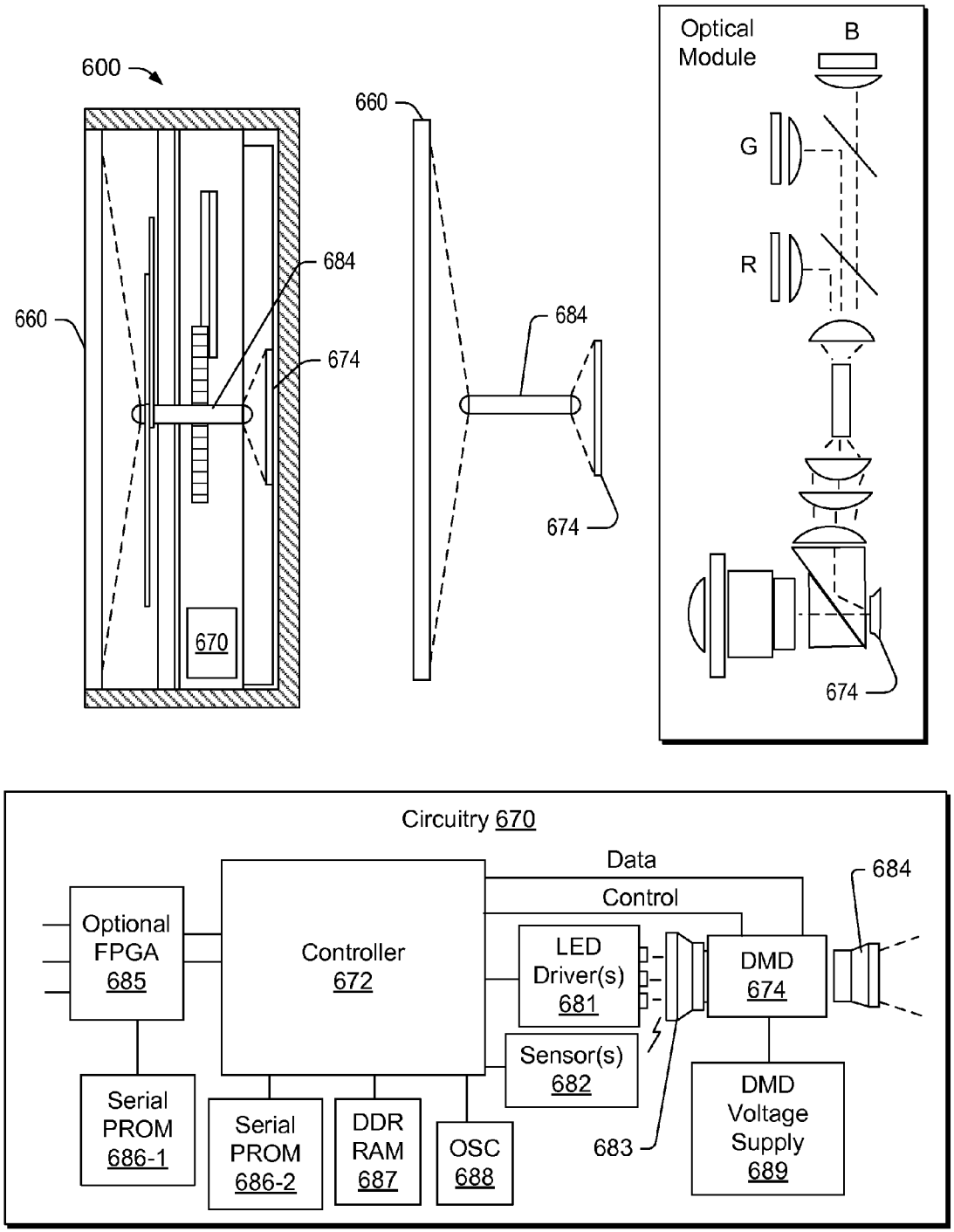
FIG. 6 is a series of diagrams of examples of projection components.

FIG. 6 shows an example of a device 600 that can include projection circuitry 670, for example, to project information on to the electronic lens 660. As an example, the electronic lens 660 may be controlled to become a projection screen (e.g., for back projection). In such an example, the electronic lens 660 may be transitioned to a back projection state and a projector actuated to project light (e.g., as one or more images, etc.) onto a surface of the electronic lens 660 where the projected light is visible via an opposing surface of the electronic lens 660.

As an example, a device may include components associated with one or more types of projection techniques such as, for example, a liquid crystal-based technique, a digital light processing-based technique, etc. As an example, a liquid-crystal-based technique may implement one or more technologies such as, for example, LCD, 3LCD, "liquid crystal on silicon", etc. As an example, a digital light processing-based (DLP) technique may implement one or more technologies such as, for example, one or more DLP chips, which may be, for example, lamp-based, laser-based, LED-based, etc.

As an example, a DLP-based image projection technique may include generating an image via a matrix of mirrors (e.g., consider a semiconductor device such as a digital micromirror device). In such an example, individual mirrors may represent one or more pixels for an image (e.g., a projected image). As an example, a number of mirrors may define image resolution. As an example, a matrix of mirrors may be controlled by repositioning to reflect light (e.g., through a lens or onto a heat sink or "light dump"). In such an example, toggling mirrors between orientations (e.g., akin to on and off states) may provide for image characteristics (e.g., image grayscales, etc.).

In FIG. 6, the circuitry 670 includes a controller 672 that is operatively coupled to a digital micromirror device (DMD) 674 that can direct light via projection optics 684 (e.g., as part of an optical module, shown as including red, R, blue, B, and green, G, drivers). As an example, an optical element such as an optical integrator may be utilized as part of a shaft (e.g., an arbor or stem) or as a shaft (e.g., as an arbor or stem). For example, in FIG. 6, the projection optics 684 may be stationary and/or rotary, for example, to move one or more indicators. As the projection optics 684 may be positioned in such a manner, indicators (e.g., hands) may not interfere with projection. As an example, a shaft can include an optical element at one end (e.g., a lens) and an optical element at an opposing end (e.g., another lens) with a cylindrical optical element disposed therebetween (e.g., one or more optical fibers, a solid optical cylinder, etc.).

As an example, the controller 672 may transmit control information, data, etc. to the DMD 674. The controller 672 may also control one or more LED drivers (e.g., for LED emitters) 681, for example, using a pulse-width modulation (PWM) technique. As an example, the controller 672 may receive information from one or more sensors 682. In such an example, a control loop may be established where a portion of emitted light is sensed via the one or more sensors 682 and used in a control algorithm to control signals to the one or more LED drivers 681 (e.g., that drive LED emitters). As shown, the DMD 674 may be operatively coupled to receive light via source side optics 683 and to project light via projection side optics 684. As an example, the device 600 may include the circuitry 670.

As shown in FIG. 6, the circuitry 670 may include various other components such as, for example, an optional field-programmable gate array (FPGA) 685, one or more serial PROMs 686-1 and 686-2, DDR RAM 687, an oscillator (OSC) 688, and a voltage supply 689. As an example, the controller 674 may include one or more interfaces. For example, the controller 674 may include one or more interfaces that may include, for example, an I²C interface.

As an example, the controller 674 may be operatively coupled to a processor of a device (e.g., via one or more interfaces). For example, a mobile device may include a processor that is operatively coupled to a controller that controls projection circuitry. As an example, a processor, a controller, etc. may be configured to control a projector that can project an adjusted image onto a surface, for example, where the adjusted image is adjusted based at least in part on characteristics of the surface and a point of view for an object with respect to the surface. As an example, a processor, a controller, etc. may be configured to determine one or more characteristics of a surface (e.g., based on received information); to determine a point of view for an object with respect to the surface (e.g., based on received information); and to project an adjusted image onto the surface, for example, where the adjusted image is adjusted based at least in part on the characteristics of the surface and the point of view for the object with respect to the surface.

As an example, the device 600 may include adjustable optics that provide for "near-screen" projection and for "far-screen" projection. For example, where the electronic lens 660 is in a back-projection state, the adjustable optics may provide for near-screen projection and where the electronic lens 660 is in a substantially transparent state, the adjustable optics may provide for far-screen projection. In such an example, the projection circuitry (e.g., circuitry 670) may be utilized for projection onto a surface such as a wall, an external projection screen, etc. As an example, an optics module may provide for focusing near (see, e.g., FIG. 6) and for focusing far (e.g., where a cone of projection may be narrower than shown in FIG. 6 and passing through the electronic lens 660). As an example, an auto-focus circuitry may be included and/or keystone adjustment circuitry. As an example, the device 600 may include communication circuitry (e.g., WIFI, BLUETOOTH, IR, etc.) such that information may be transmitted to the device 600 and projected via projection circuitry. As an example, the device 600 may include memory, optionally removable memory (e.g., a micro-card that can be inserted and removed from a micro-card slot). In such an example, information may be read from the memory and rendered to a screen (e.g., near or far).

As an example, a mobile device may include projection circuitry. In such an example, the mobile device may conform to a form factor. As an example, a mobile device may be a smartphone. As an example, a mobile device may be a wristwatch or other type of watch.

Figure 7:
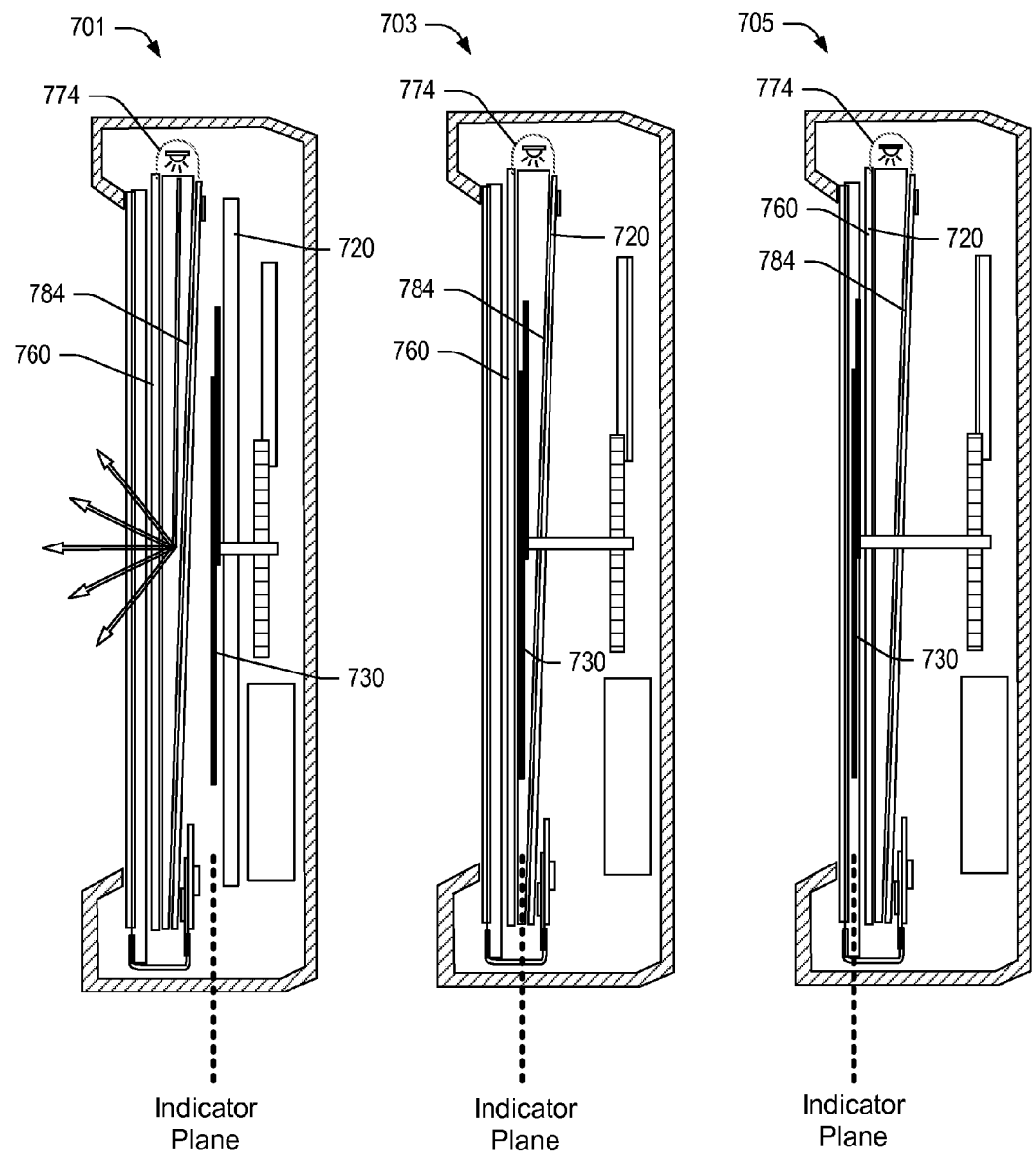
FIG. 7 is a series of diagrams of examples of devices.

FIG. 7 shows an example of a device 701, an example of a device 703 and an example of a device 705. The devices 701 and 703 can include circuitry for back projection, for example, using an LED backlighting scheme such as an on-edge array 774. The device 705 may optionally include circuitry for back projection and/or other display circuitry.

In the example devices 701, 703 and 705, the one or more indicators 730 may be defined via an indicator plane, which is represented by a dotted line. In the example devices 703 and 705, the one or more indicators 730 may optionally be made of smart glass such that they are of adjustable opacity. In such examples, one or more indicators may be made substantially transparent (e.g., translucent) to reduce obscuring of information rendered to a display.

As shown in the examples of FIG. 7, the array 774, as a light source, may be positioned, for example, slightly behind an outer edge of an LCD panel 760, which, in the example device 705 may also function as a dial 720 (e.g., the LCD panel 760 may function as a dial). As an example, an array may be circular, semi-circular, linear, bi-linear, etc. As shown, a light guide 784 in the example devices 701 and 703 can direct and spread light across the back of the LCD panel 760. The light guide 784 may be, for example, a wedge of plastic that directs light across, and then perpendicular to, a flat surface of the LCD panel 760. As an example, a light guide may be a switchable mirror, for example, a surface that can be switched from translucent to a mirror finish (e.g., reflective surface). As an example, a light guide may include transition metal hydride electrochromics.

As an example, the LCD panel 760 can be operatively coupled to circuitry that can control its opacity. As an example, the light guide 784 can be operatively coupled to circuitry that can control its opacity. As an example, the LCD panel 760 and the light guide 784 can be operatively coupled to circuitry that can control their opacity.

In the example device 701, a dial 720 and indicators 730 are disposed behind the light guide 784; hence, where the light guide 784 is translucent, the dial 720 and the indicators 730 may be visible through the LCD panel 760 (e.g., a translucent LCD panel).

In the example device 703, the indicators 730 are disposed in front of the light guide 784 and the light guide 784 may optionally function as the dial 720 (e.g., to include markings, etc.). In such an example, the dial 720 and the indicators 730 may be visible through the LCD panel 760 (e.g., a translucent LCD panel). As mentioned, the indicators 730 may optionally be made of a material this is of controllable opacity.

In the example device 705, the indicators 730 are disposed in front of the LCD panel 760, which may function as the dial 720. In such an example, the LCD panel 760 may be a back-lit panel via the light guide 784 and the array 774. As an example, an LCD panel and/or a light guide may include markings, which may optionally be permanent markings and/or controllable opacity markings.

As an example, in a first state, the device 705 can have the indicators 730 in a substantially opaque state such that they are readily visible. Where the indicators 730 may obscure information rendered via the LDC panel 760, one or more of the indicators may be transitioned to a state where it or they are substantially transparent (e.g., translucent).

As an example, a device such as the device 705 may include a world time feature as to time zones. In such an example, the LCD panel 760 may function as an adjustable dial for the indicators 730 where hour marking may be adjusted to conform within time in a selected time zone (e.g., selected from a plurality of selectable time zones). Where the LCD panel 760 is to render information such as weather, text messages, voice call information, etc., and where the indicators 730 are of adjustable opacity, circuitry operatively coupled to the indicators 730 may act to adjust their opacity to reduce the indicators 730 obscuring information rendered to the LCD panel 760.

Figure 8:
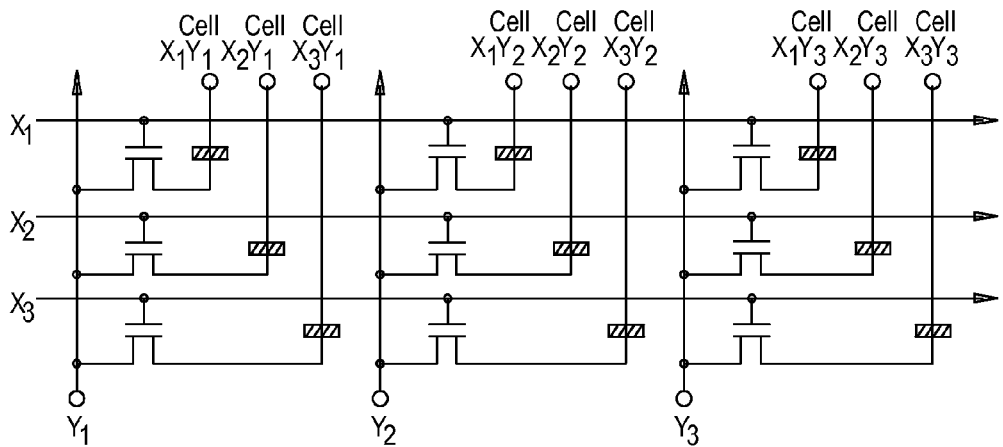
FIG. 8 is a series of diagrams of an example of a display system.
Figure 8:
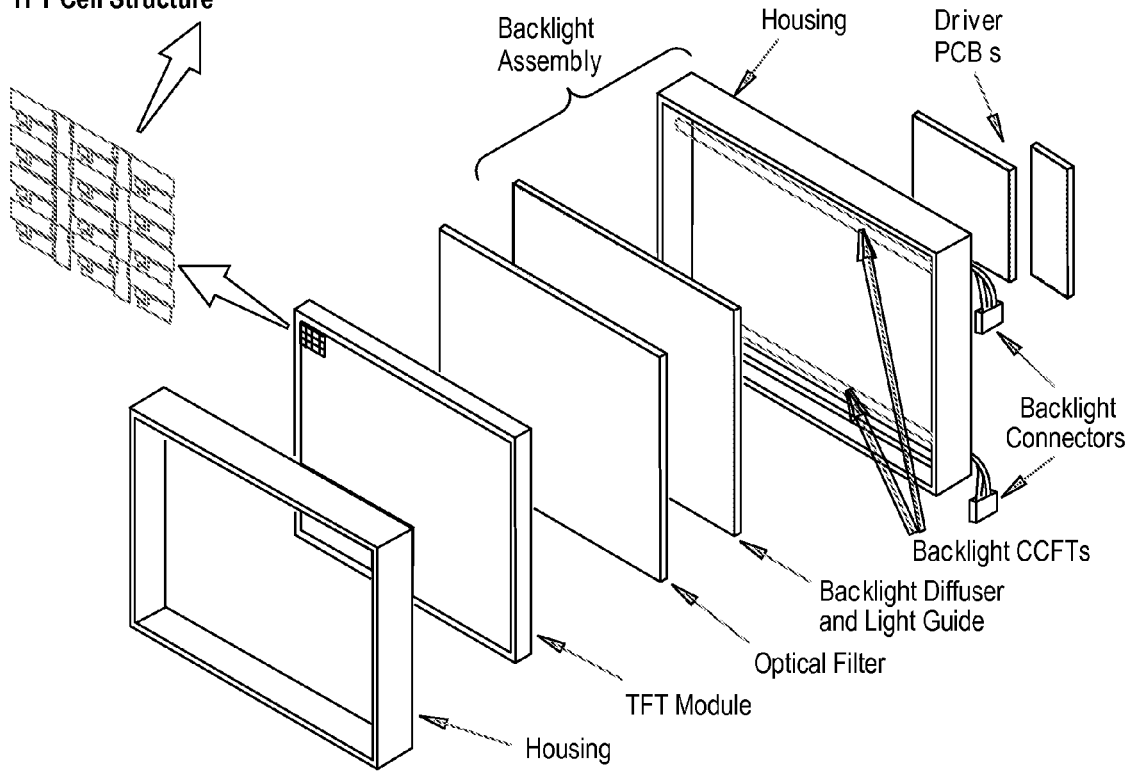

FIG. 8 shows an example of a display system 800. The system 800 is a backlighting system for a liquid crystal display (LCD). One or more components of the system 800 may be included in a device such as, for example, the device 100 of FIG. 1, the device 701 of FIG. 7, the device 703 of FIG. 7, the device 705 of FIG. 7, etc.

As shown, the system 800 includes a mix of crystalline material suspended in a liquid medium and sandwiched between two pieces of glass (e.g., or other suitable material). The light source or backlight is behind the glass and passes through the LCD, an effect similar to shining a light through a translucent material. Semiconductor switches within an LCD cause the crystalline material to act as a shutter, thereby controlling the light coming through the liquid crystal optical stack. The resulting image corresponds to the electronic data information supplied to the display pixel array, which acts as a variable light valve to pass or inhibit the light through individual pixels (e.g., colored pixels, etc.).

Figure 9:
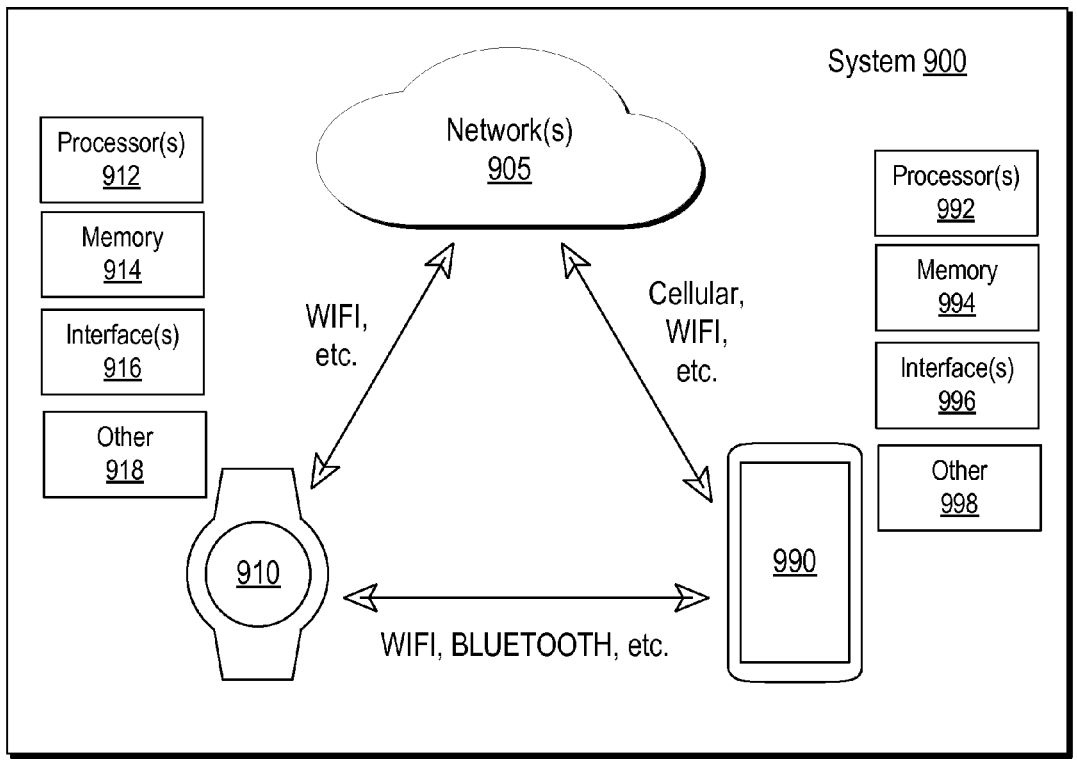
FIG. 9 is a series of diagrams of an example of a system that includes a wearable device such as a smart watch.
Figure 9:
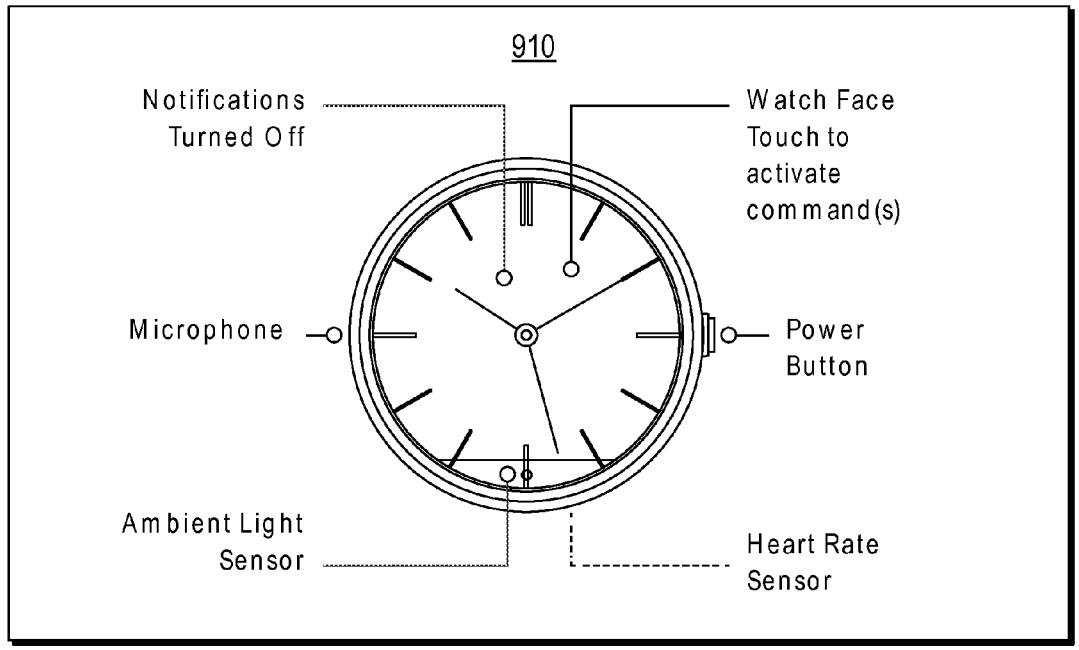

FIG. 9 shows an example of a system 900 that includes one or more networks 905, a watch 910 and a phone 990. As shown, the watch 910 can include one or more processors 912, memory 914, one or more interfaces 916 and one or more other components 918. As shown, the phone 990 can include one or more processors 992, memory 994, one or more interfaces 996 and one or more other components 998. As an example, a device can include a processor and memory operatively coupled to the processor. In such an example, the memory can store instructions executable by the processor to instruct the device to perform one or more actions. As an example, an interface may be a wireless communication interface (e.g., for transmission and/or reception of information).

As shown in the example of FIG. 9, the device 910 can include various components with associated functions. For example, the device 910 can include one or more of a microphone, a speaker, a light sensor, a physiological sensor (e.g., a heart rate sensor), an accelerometer, a power button (e.g., a power switch), a touch sensor, one or more lights such as a notification status light, etc. As an example, one or more of such components may be operatively coupled to a processor of the device. As an example, a particular predefined motion of a device such as the device 910 may be sensed by an accelerometer and cause the device 910 to transition from one state to another state (e.g., change opacity).

As an example, a device can include a dial and an indicator for registering time. Such a device can include an electronic lens with an adjustable opacity. As an example, an electronic lens may be a panel. As an example, a device can be a smart watch that includes an analog dial and indicator. In such an example, a user may glance at the time, optionally without turning on a display of the smart watch.

As an example, a device can include a dial and/or one or more indicators that can respond to an electrically powered field whereby the opacity of the dial and/or the one or more indicators may be adjusted.

As an example, where a device includes a battery, the device, as powered by the battery, may be transitioned to a low power state where an electronic lens is in a translucent state such that, for example, an analog dial may be visible and register time (e.g., or an analog dial of a gauge may register a measurement, etc.). Such a low power state may supply an amount of power to generate a field that causes the electronic lens to be in a translucent state. For example, where the electronic lens includes particles, an electrically generated field can cause at least a portion of the particles to align in a manner that allows light to pass through the electronic lens.

As an example, where a smart watch function is triggered (e.g., automatically or via user interaction), power from a power source such as a battery may be controlled, for example, alter electrical power to a field that can cause an electronic lens to change state. In such an example, the electronic lens may cover at least a portion of a dial. After a period of time, the electronic lens may transition again to a state where the electronic lens may be translucent. Such a transition may be, for example, automatic or via user interaction.

As an example, a device can include an electronic lens that is substantially transparent (e.g., translucent) in a low power or no power state of the device that can transition to another state upon an increase in power.

As an example, a device can include an electronic lens that is substantially transparent (e.g., translucent) in a power state of the device that can transition to another state upon a decrease in power (e.g., to a lower power state or a no power state).

As an example, a device can include smart glass that operates in translucent mode, allowing light to pass through and making it possible to glance at an analog dial (e.g., as to time, etc.). In such an example, smart watch features may involve rendering information to a display. In such an example, the smart glass can be switched to a different state that is substantially opaque to block the view of at least a portion of the analog dial and to display desired information. In such an example, when a user has finished reviewing the rendered information, the smart glass can transition back to the translucent state (e.g., of the translucent mode where the smart glass may be substantially transparent).

As an example, a tablet device such as, for example, an e-reader device, may include an electronic lens. For example, smart glass may be used in a translucent mode to allow an e-reader to work for people that prefer paper-like quality content, but when normal tablet functions or combined operation (e.g., certain areas of the display for tablet-like operation) are to be employed, the smart glass can be turned on to block the e-reader view (or parts of it) and display the desired content.

As an example, a device can include a case that includes a dial and an indicator; a mechanism operatively coupled to the indicator and disposed at least in part in the case; an electronic lens that covers at least a portion of the dial; and circuitry that controls opacity of the electronic lens. In such an example, the electronic lens can include a substantially transparent state and at least one substantially opaque state.

As an example, an electronic lens can include particles that respond to an electrically powered field generated at least in part by circuitry that can control opacity of the electronic lens. As an example, particles can include liquid crystals. As an example, an electronic lens can include dispersed particles orientable via one or more electrically powered fields. As an example, an electronic lens can include electrochromic material. As an example, an electronic lens can include at least one transparent electrode.

As an example, a device can include a band operatively coupled to a case.

As an example, an indicator may be an hour hand. As an example, a mechanism can include at least one gear.

As an example, a device can include a power source, for example, disposed at least in part in a case. As an example, a device can include an electronic power source and a mechanical power source. As an example, such a mechanical power source can include a spring.

As an example, circuitry can include a processor and memory accessible by the processor.

As an example, a device can include a gauge case and a gauge dial.

As an example, a device can include a sensor operatively coupled to circuitry where the circuitry controls opacity of an electronic lens based at least in part on a signal of the sensor.

As an example, a device can include an electronic lens that is or includes an electronic display.

As an example, a method can include controlling an indicator of a dial; for a period of time, rendering information to an electronic display that covers at least a portion of the dial; and after the period of time, adjusting opacity of the electronic display to a substantially transparent state.

As an example, one or more computer-readable storage media can include processor-executable instructions executable to instruct a computing device to: render information to an electronic display that covers at least a portion of a dial; and adjust opacity of the electronic display to a substantially transparent state.

As described herein, various acts, steps, etc., may be implemented as instructions stored in one or more computer-readable storage media where a computer-readable storage medium is not a signal. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 10:
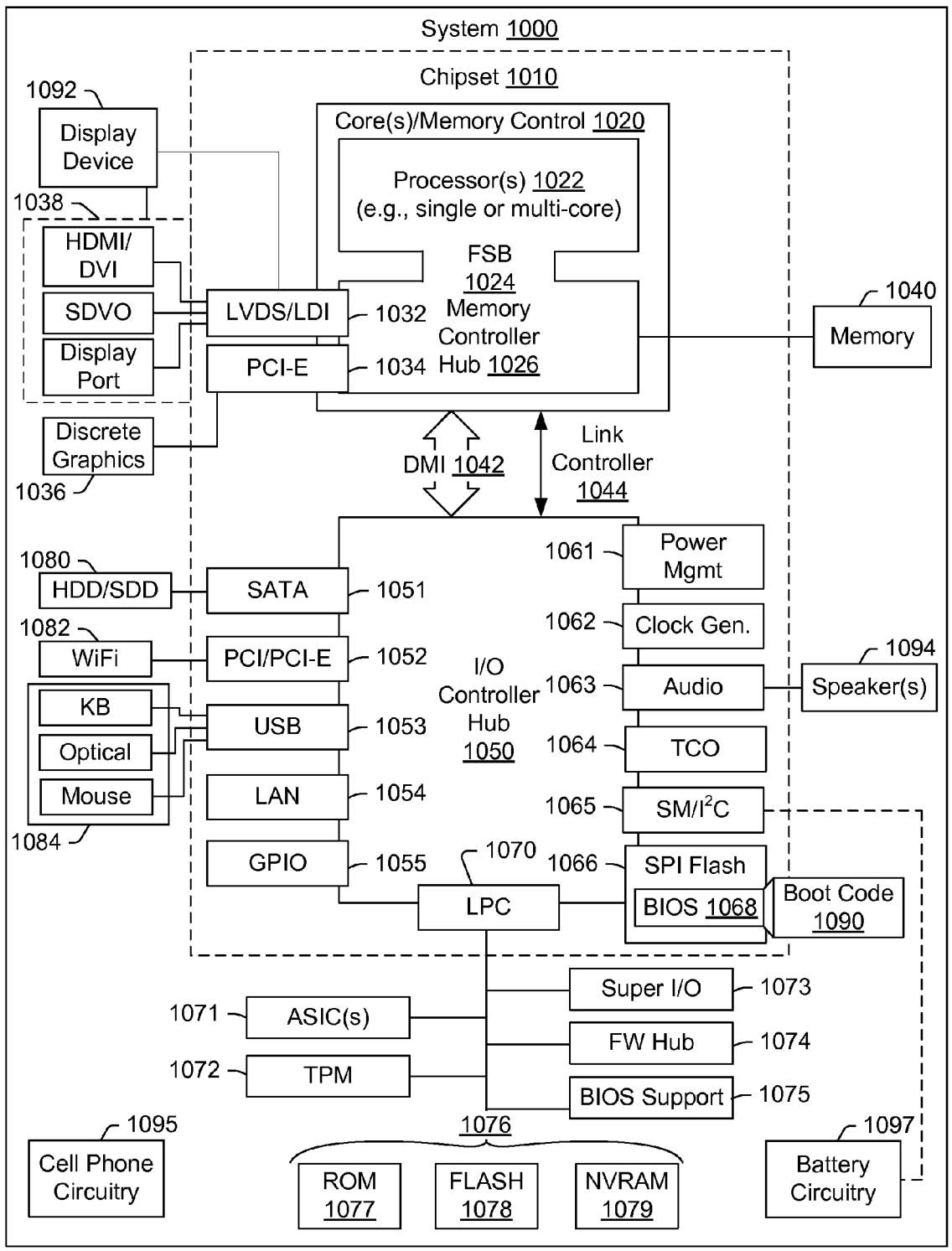
FIG. 10 is a diagram of an example of a system.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As an example, a device such as one of the devices of FIG. 1, FIG. 2, FIG. 3, FIG. 4, etc. may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). One or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a case that comprises a dial and an indicator;
a mechanism operatively coupled to the indicator and disposed at least in part in the case;
an electronic lens that covers at least a portion of the dial;
circuitry that controls opacity of the electronic lens and that transitions the electronic lens to a back projection state; and
projection circuitry actuatable to project light as an image onto a surface of the electronic lens in the back projection state wherein the image is visible via an opposing surface of the electronic lens.

2. The apparatus of claim 1 wherein the electronic lens comprises a substantially transparent state and at least one substantially opaque state.

3. The apparatus of claim 1 wherein the electronic lens comprises particles that respond to an electrically powered field generated at least in part by the circuitry to control opacity of the electronic lens.

4. The apparatus of claim 3 wherein the particles comprise liquid crystals.

5. The apparatus of claim 3 wherein the particles comprise dispersed particles orientable via one or more electrically powered fields.

6. The apparatus of claim 1 wherein the electronic lens comprises electrochromic material.

7. The apparatus of claim 1 wherein the electronic lens comprises at least one transparent electrode.

8. The apparatus of claim 1 comprising a band operatively coupled to the case.

9. The apparatus of claim 1 wherein the mechanism comprises at least one gear.

10. The apparatus of claim 1 comprising a power source.

11. The apparatus of claim 1 comprising an electronic power source and a mechanical power source.

12. The apparatus of claim 1 wherein the circuitry comprises a processor and memory accessible by the processor.

13. The apparatus of claim 1 wherein the case comprises a gauge case and wherein the dial comprises a gauge dial.

14. The apparatus of claim 1 comprising a sensor operatively coupled to the circuitry wherein the circuitry controls opacity of the electronic lens based at least in part on a signal of the sensor.

15. The apparatus of claim 1 wherein the electronic lens comprises an electronic display.

16. The apparatus of claim 1 wherein the back projection state corresponds to a near-screen projection mode, wherein the electronic lens comprises a substantially transparent state and wherein, in the substantially transparent state, the projection circuitry is actuatable in a far-screen projection mode to project light as an image through the electronic lens and onto a surface external to the apparatus.

17. The apparatus of claim 1 comprising adjustable optics that comprise a near-screen projection mode associated with the electronic lens in the back projection state and a far-screen projection mode associated with the electronic lens in a substantially transparent state.

18. The apparatus of claim 1 wherein the projection circuitry comprises digital light processing (DLP) circuitry that projects the light of the image wherein the image comprises a pixel-based image.

19. A method comprising:
controlling an indicator of a dial;
transitioning at least a portion of an electronic lens that covers at least a portion of the dial to a back projection state;
for a period of time, projecting light as an image onto the electronic lens in the back projection state; and
after the period of time, transitioning the at least a portion of the electronic lens from the back projection state to a substantially transparent state.

20. One or more computer-readable storage media comprising processor-executable instructions executable to instruct a computing device to:
project light as an image onto an electronic display that covers at least a portion of a dial wherein at least a portion of the electronic display is in a back projection state; and
adjust opacity of the electronic display to transition the at least a portion of the electronic display that is in the back projection state to a substantially transparent state.

* * * * *